(12) United States Patent
Sayeedi

(10) Patent No.: US 7,359,353 B2
(45) Date of Patent: Apr. 15, 2008

(54) ACCESS NETWORK AND METHOD FOR IMPROVED INTER-PDSN DORMANT MODE HANDOFF

(75) Inventor: Shahab M. Sayeedi, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/828,874

(22) Filed: Apr. 21, 2004

(65) Prior Publication Data

US 2005/0237977 A1    Oct. 27, 2005

(51) Int. Cl.
*H04Q 7/00* (2006.01)

(52) U.S. Cl. .............. 370/331; 370/373; 370/384; 370/395.21; 370/410; 370/522; 455/439; 455/450.5

(58) Field of Classification Search ........ 370/328–329, 370/331–335, 342, 384, 373, 395.21, 410, 370/522; 455/422–439, 445–452.2, 525, 455/440, 444
See application file for complete search history.

(56) References Cited

U.S. PATENT DOCUMENTS

| | | | |
|---|---|---|---|
| 7,043,249 | B2 | 5/2006 | Sayeedi |
| 2001/0050907 | A1* | 12/2001 | Madour et al. ............. 370/329 |
| 2002/0141369 | A1* | 10/2002 | Perras ........................ 370/338 |
| 2003/0021252 | A1* | 1/2003 | Harper et al. ............... 370/338 |
| 2003/0053431 | A1* | 3/2003 | Madour ...................... 370/331 |
| 2003/0219024 | A1* | 11/2003 | Purnadi et al. ............. 370/401 |
| 2004/0022212 | A1 | 2/2004 | Chowdhury et al. |
| 2004/0105400 | A1* | 6/2004 | Jean ........................... 370/311 |
| 2004/0162031 | A1* | 8/2004 | Athalye ...................... 455/69 |
| 2004/0214574 | A1* | 10/2004 | Eyuboglu et al. .......... 455/439 |
| 2005/0226154 | A1* | 10/2005 | Julka et al. ................. 370/235 |

OTHER PUBLICATIONS

3G: 3rd Generation partnership Project 2 "3GPP2", "Interoperability Specification (IOS) for cdma2000 Access Network Interfaces-Part 3 Features (3G-IOSv4.3)", 3GPP2 A.S0013-A, Version 2.0.1, Jul. 2003, Sections 2.17.9, 3.17.4.10, 3.17.5.9, 3.19.6.1.

* cited by examiner

*Primary Examiner*—Joseph Feild
*Assistant Examiner*—Inder Pal Mehra

(57) ABSTRACT

Various embodiments are described herein to address the need to have a method and apparatus that improve the resource efficiency of inter-PDSN (142 to 141) dormant mode handoffs. Promptly after the completion of signaling (218) for PPP connection establishment and MIP registration (if supported), as required for an inter-PDSN dormant mode handoff, an access network (AN) 121 expedites the release of communication resources such as the wireless traffic channel, the SCCP connection, and the A8 bearer connection. Thus, in an inter-PDSN dormant mode handoff the packet data session of an MS (101) is promptly transitioned back to the dormant packet data state. This enables communication resources to be freed for other calls and/or handoffs in a more timely manner than is enabled today.

25 Claims, 4 Drawing Sheets

ACCESS NETWORK AND METHOD FOR IMPROVED INTER-PDSN DORMANT MODE HANDOFF

REFERENCE TO RELATED APPLICATION

This application is related to a co-pending application, Ser. No. 11/333,866, entitled "PACKET DATA SERVING NODE INITIATED UPDATE FOR A MOBILE COMMUNICATION SYSTEM," filed Jan. 19, 2006, which is a continuation of application Ser. No. 10/497,869, filed Nov. 13, 2002, issued as U.S. Pat. No. 7,043,249, both of which are assigned to the assignee of the present application and both of which claim priority to provisional application 60/346,700, filed Jan. 08, 2002.

FIELD OF THE INVENTION

The present invention relates generally to mobile communication systems and, in particular, to inter-PDSN dormant mode handoffs of packet data sessions.

BACKGROUND OF THE INVENTION

The 3G (3rd generation) packet data feature allows users to exchange packet data between a mobile station (MS) and an IP data network. A Packet Data Serving Node (PDSN) interfaces between data transmission in the packet data network and the data transmission to the MS via a Radio Access Network (RAN) and air interface. PPP (point to point protocol) is used to support the data link layer between the PDSN and MS. Therefore, a PPP session needs to be established before PDSN-MS, IP datagram exchange can begin.

For each packet data session, a "main" packet data service instance (PDSI) is required to negotiate and setup the PPP session and support Mobile IP (MIP) registration (if MIP is supported). A packet data session can support multiple packet data service instances (PDSIs—up to six can be supported per the 3GPP2 A.S0011-A.S0017-A (TIA-2001-C) standards specifications). Therefore, one of these PDSI's serves as the main PDSI and is used to support PPP negotiation and MIP registration for the packet data session. Any additional PDSIs supported by the packet data session are considered auxiliary service instances. Prior to establishment of any auxiliary PDSIs, however, a main PDSI must be setup and a PPP session first established.

PPP connection establishment procedures are required whenever a new packet data call is initiated, an inter-PDSN dormant reactivation occurs, an intor-PDSN active handoff occurs, or an inter-PDSN dormant mode handoff (DMHO) occurs. MIP Registration is also required when Mobile IP is supported. Resources such as air traffic channels, A8 and A10 bearer resources, and SCCP connections are usually required at least to complete PPP establishment and MIP registration. However, currently these resources may be held until the call is disconnected, until an MS or RAN inactivity timer expires, or until the PPP session timer expires. For situations such as dormant mode handoff, in particular, this can result in a relatively long period of time during which network resources are blocked from other revenue producing uses. Moreover, in PDSN border areas, or during peak traffic times when PDSNs are running near capacity, inter-PDSN dormant mode handoffs can occur frequently and thereby compound this problem.

Accordingly, it would be desirable to have a method and apparatus that improve the resource efficiency of inter-PDSN dormant mode handoffs.

DETAILED DESCRIPTION OF EMBODIMENTS

Various embodiments are described herein to address the need to have a method and apparatus that improve the resource efficiency of inter-PDSN (142 to 141) dormant mode handoffs. Promptly after the completion of signaling (218) for PPP connection establishment and MIP registration (if supported), as required for an inter-PDSN dormant mode handoff, an access network (AN) 121 expedites the release of communication resources such as the wireless traffic channel, the SCCP connection, and the A8 bearer connection. Thus, in an inter-PDSN dormant mode handoff the packet data session of an MS (101) is promptly transitioned back to the dormant packet data state. This enables communication resources to be freed for other calls and/or handoffs in a more timely manner than is enabled today.

Embodiments of the present invention encompass a method for improved inter-PDSN (Packet Data Serving Node) dormant mode handoff. The method for an Access Network (AN) comprises exchanging with a target PDSN signaling to support an inter-PDSN handoff of a packet data session of a mobile station (MS), establishing with the MS a traffic channel (TCH) to support the inter-PDSN handoff, and determining that signaling between the MS and the target PDSN related to the inter-PDSN handoff has been completed. Then, in response to the determination that signaling has been completed, the method comprises releasing the TCH.

Embodiments of the present invention also encompass an Access Network (AN) that comprises a packet control function (PCF), adapted to exchange with a target PDSN signaling to support an inter-PDSN handoff of a packet data session of a mobile station (MS), and a base station (BS) communicatively coupled to the PCF. The BS is adapted to establish with the MS a traffic channel (TCH) to support the inter-PDSN handoff, adapted to determine that signaling between the MS and the target PDSN related to the inter-PDSN handoff has been completed, and adapted to release the TCH in response to the determination that signaling has been completed.

Figure 1:
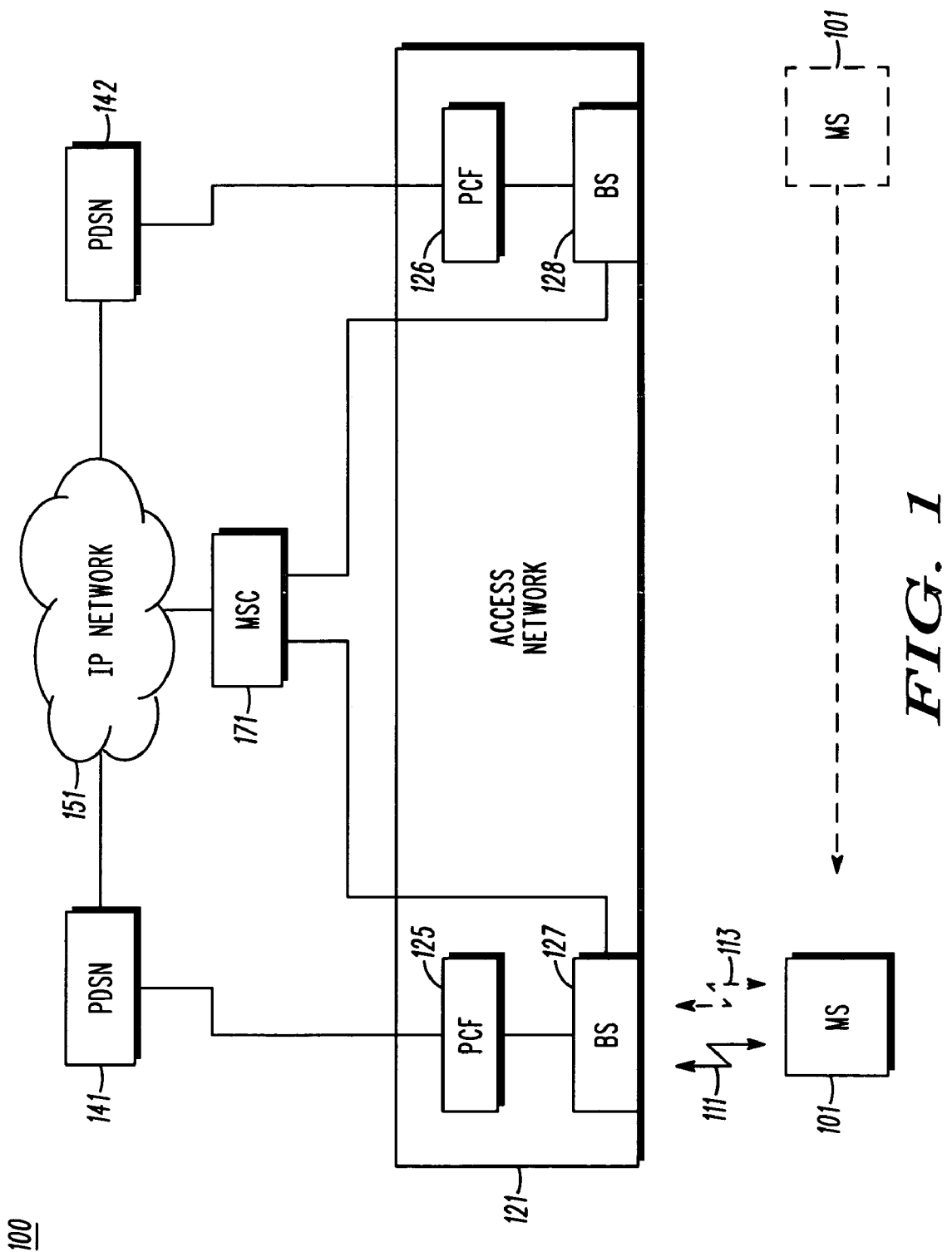
FIG. 1 is a block diagram depiction of a mobile communication system in accordance with multiple embodiments of the present invention.

The disclosed embodiments can be more fully understood with reference to FIGS. 1-4. FIG. 1 is a block diagram depiction of a mobile communication system 100 in accordance with multiple embodiments of the present invention. Communication system 100 is a well-known Code Division Multiple Access (CDMA) system, specifically a cdma2000 system, which is based on the Telecommunications Industry Association/Electronic Industries Association (TIA/EIA) standards TIA-2000 and TIA-2001, suitably modified to implement the present invention. Alternative embodiments of the present invention may be implemented in communication systems that perform inter-PDSN dormant mode handoffs similar to TIA-2000 and TIA-2001. These include, but are not limited to, TIA-878 and TIA-1878 communication systems which support the TIA-856 (1×EV-DO or HRPD) air interface.

Those skilled in the art will recognize that FIG. 1 does not depict all of the network equipment necessary for system 100 to operate but only those system components and logical entities particularly relevant to the description of embodiments of the present invention. In particular, the network equipment of system 100 comprises components such as access network (AN) 121, base stations (BSs) 127 and 128, mobile switching center (MSC) 171, packet control functions (PCFs) 125 and 126, packet data serving node (PDSNs) 141 and 142, and internet protocol (IP) network 151. Generally, ANs, BSs, MSCs, PCFs, PDSNs, and IP networks are known in the art. For example, ANs are well-known to comprise components such as BSs and PCFs as depicted in FIG. 1. Also, BSs are well-known to comprise components such as base station controllers (BSCs) and base transceiver systems (BTSs), although neither of which are specifically depicted in FIG. 1.

More generally, BSs are known to comprise basic components such as, but not limited to, microprocessors, microcontrollers, memory devices, and/or logic circuitry. Such BS components are typically adapted to implement algorithms and/or protocols that have been expressed using high-level design languages or descriptions, expressed using computer instructions, expressed using messaging flow diagrams, and/or expressed using logic flow diagrams. Thus, given an algorithm, a logic flow, a messaging flow, and/or a protocol specification, those skilled in the art are aware of the many design and development techniques available to implement a BS that performs the given logic.

Thus, BSs 127 and 128 represent known BSs that have been adapted, in accordance with the description herein, to implement multiple embodiments of the present invention. Furthermore, the adaptations to known BSs described herein are not intended to refer specifically to BSC or BTS components, since the adaptations described can extend across separate physical components that perhaps are not even co-located.

BS 127 uses air interfaces comprising TIA-2000 channels 111 and 113 for communication with remote unit 101. TIA-2000 terminology refers to remote units as mobile stations (MSs). Remote unit/MS platforms are known in the art to include devices such as mobile phones, computers, personal digital assistants, gaming devices, etc. Channel 111 comprises a variety of well-known non-traffic channel types, such as broadcast channels, paging channels, access channels, and common control channels. Channel 113 comprises a dedicated traffic channel (TCH), which is dynamically assigned and de-assigned to support user services and system operation.

In general, a packet data session consists of one or more packet data service instances (PDSIs). The PDSI states associated with service option 33 (high speed packet data) are specified in 3GPP2-C.S0017-0-v5.0 (TIA-707-A-3). 3GPP2-A.S0013-A v2.0.1 (TIA-2001-C) also specifies three states associated with a packet data session. They include the Null/inactive State, the Dormant State, and the Active/Connected State.

The Null/inactive State is a radio access network (RAN) packet data session state where all service instances are in the Inactive/Null State and there is no traffic channel between the MS and the BS and no PPP link between the MS and the PDSN. The Dormant State is a RAN packet data session state where all service instances are dormant and no physical traffic channel exists between the MS and the BS, but the PPP link between the MS and the PDSN is maintained. The Active/Connected State is a RAN packet data session state where at least one service instance is active and a physical traffic channel exists between the MS and the BS; either side may send data on the active service instances. Additionally, a PPP session describes the time during which the main service instance is maintained between the MS and the Serving PDSN. The PPP session is maintained while the MS is dormant. If a user hands off from one BS to another, but is still connected to the same PDSN, the PPP session remains connected.

Figure 2:
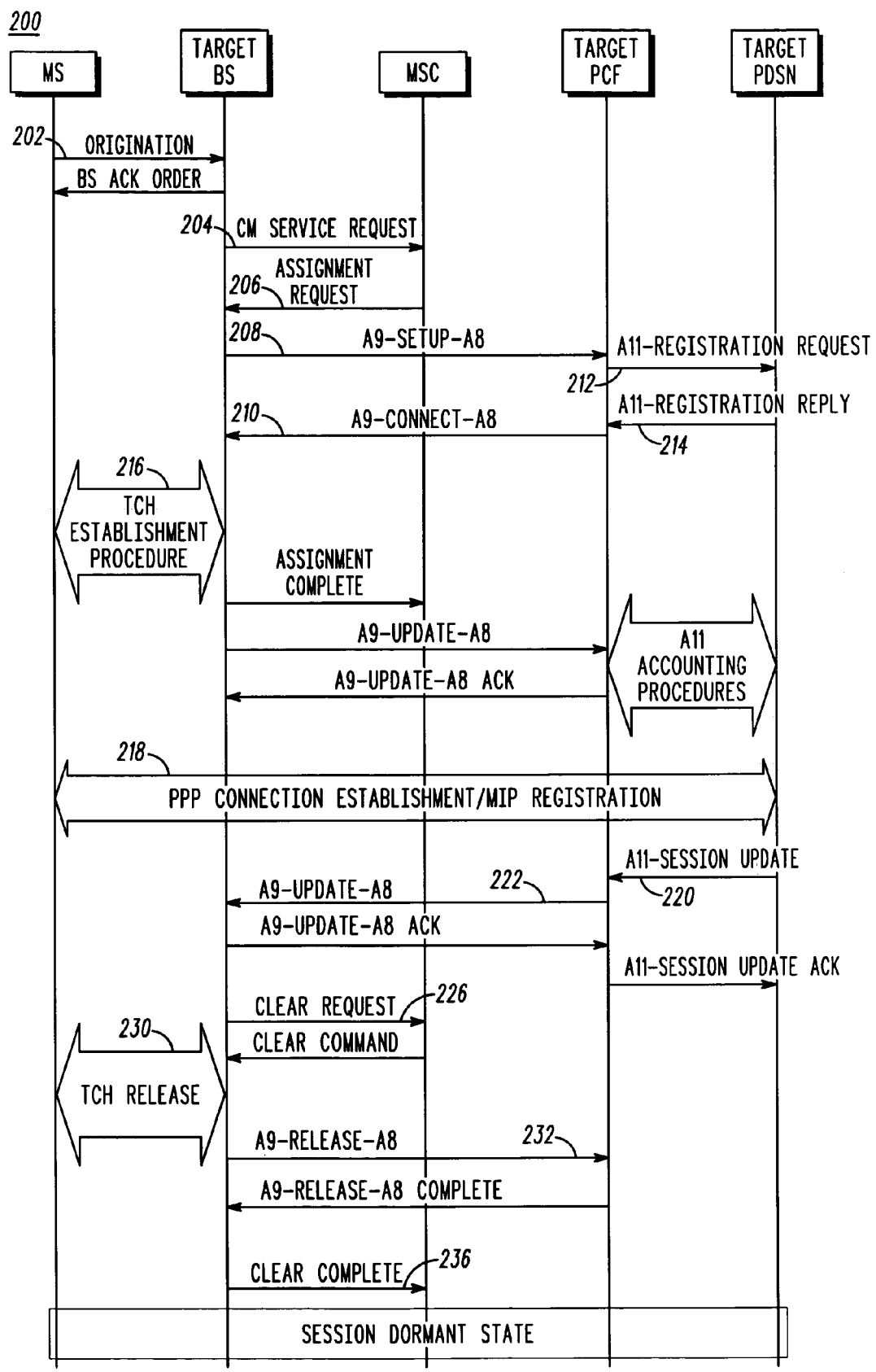
FIG. 2 is a signaling flow diagram depicting a first group of embodiments for improved inter-PDSN dormant mode handoffs.
Figure 3:
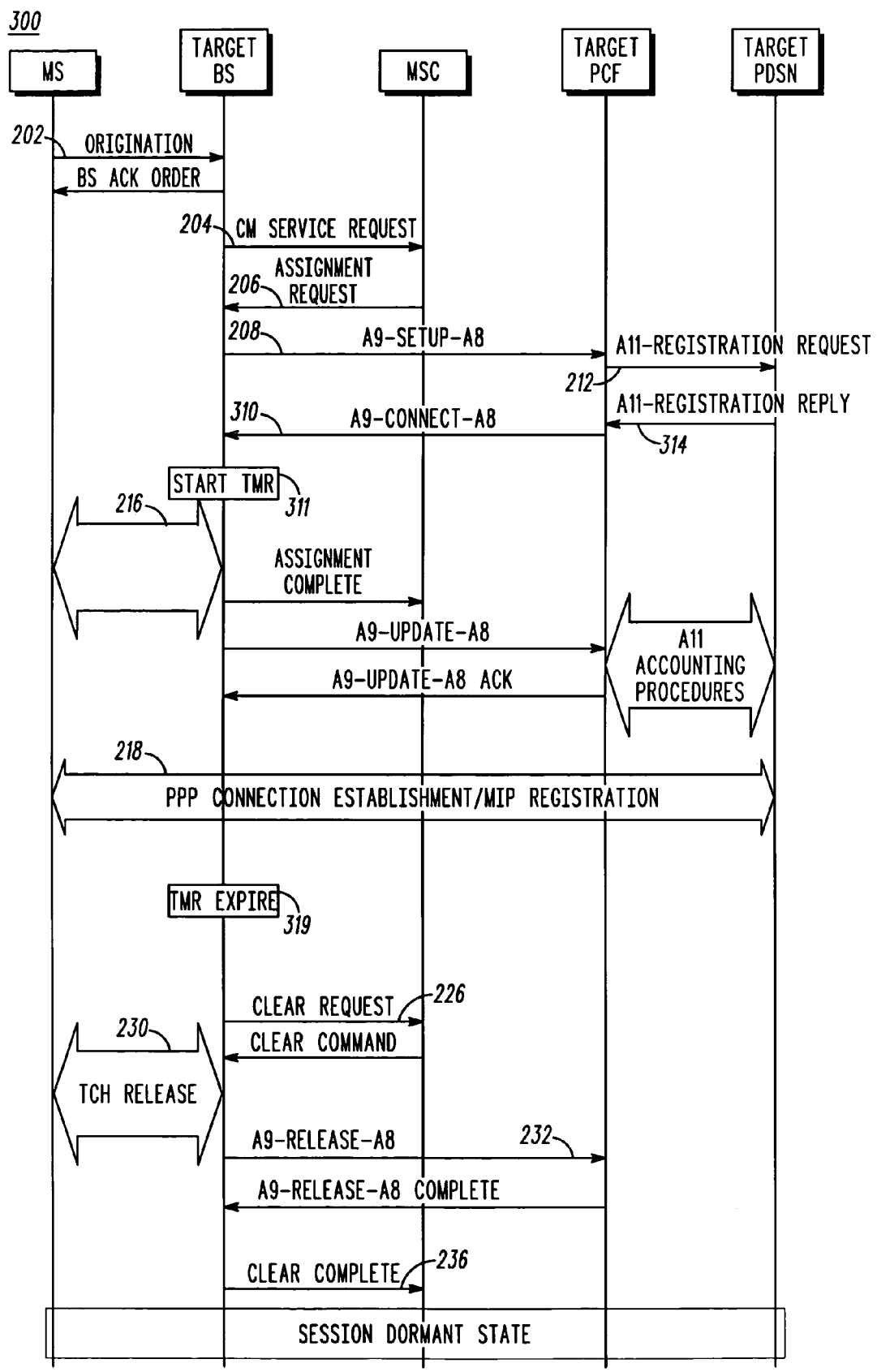
FIG. 3 is a signaling flow diagram depicting a second group of embodiments for improved inter-PDSN dormant mode handoffs.
Figure 4:
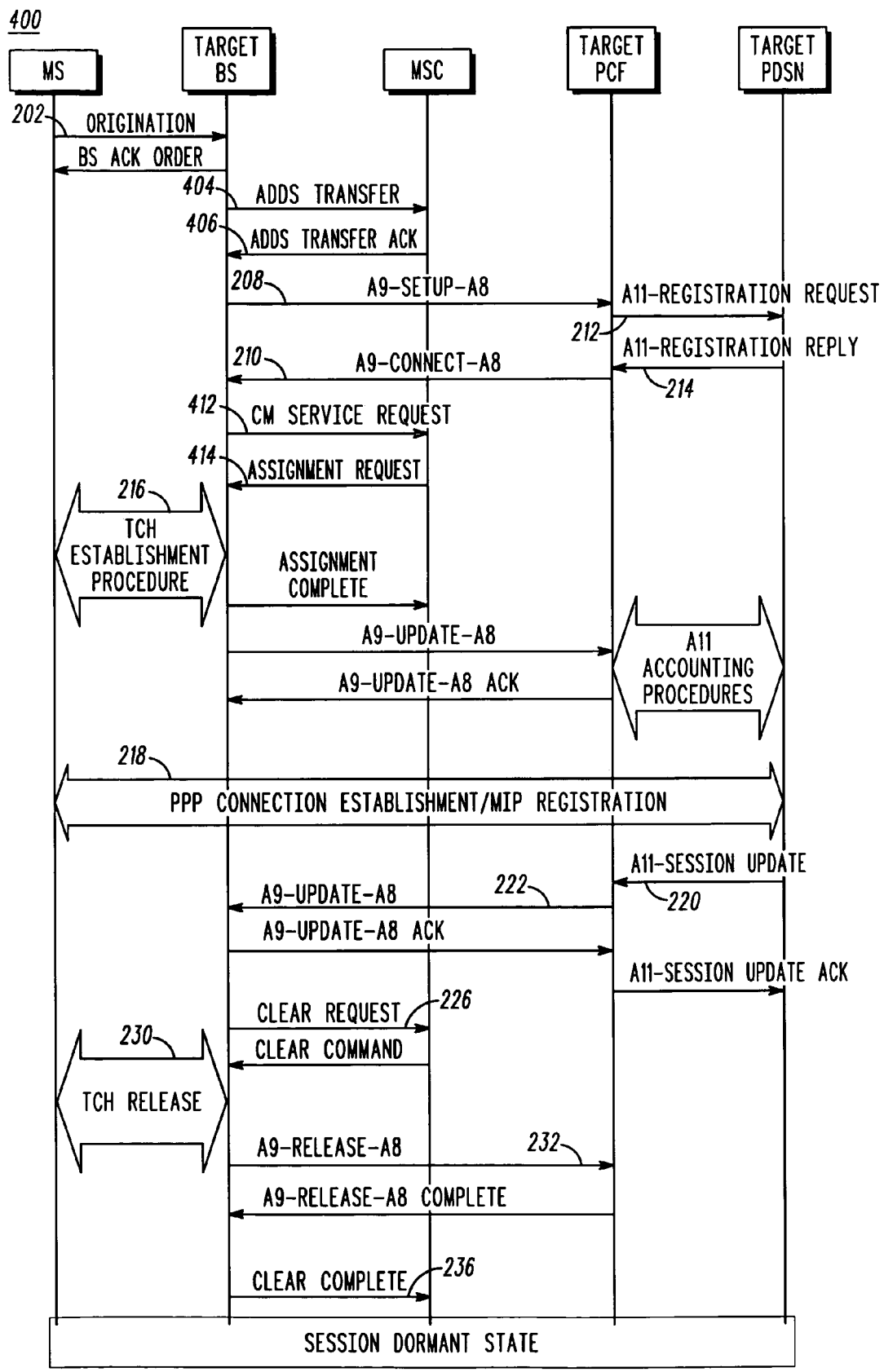
FIG. 4 is a signaling flow diagram depicting some alternative signaling to that illustrated in FIG. 2 for the first group of embodiments.

Operation of embodiments in accordance with the present invention occurs substantially as follows. FIGS. 2-4 show signaling flow diagrams 200, 300, and 400, which depict various embodiments for improved inter-PDSN dormant mode handoffs. In general, signaling flow diagrams 200, 300, and 400 show modifications to the signaling described in the TIA-2001.3 standard (specifically, sections 3.17.4.10, 3.17.5.9, and 3.19.6.1) for implementing various embodiments of the present invention. In addition, these diagrams have been simplified to emphasize the most relevant signaling and modifications to the standard. They are not intended to depict all signaling or all variations of signaling that may occur. For example, they are focused on signaling that supports an inter-PDSN dormant mode handoff of a main PDSI, but not auxiliary PDSIs, which are handed off after the main PDSI and do not require PPP or MIP registration procedures.

Signaling flow diagram 200 depicts a first group of embodiments for improved inter-PDSN dormant mode handoffs. While in a dormant state, MS 101 hands off from BS 128 to BS 127. Since MS 101 is handing off across a PDSN service boundary, an inter-PDSN handoff from source PDSN 142 to target PDSN 141 is also required. MS 101 sends an Origination message 202 to BS 127. In response, BS 127 sends MSC 171 a CM Service Request message 204. Signaling 204 triggers the establishment of SCCP resources between BS 127 and MSC 171. MSC 171 responds to BS 127 with an Assignment Request message 206.

BS 127 also proceeds to initiate establishment of an A8 bearer connection with PCF 125 by sending an A9-Setup-A8 message 208. In response, PCF 125 exchanges signaling to support the inter-PDSN handoff with a target PDSN 141. Specifically, A11-Registration Request 212 and A11-Registration Reply 214 are exchanged, and PCF replies to BS 127 with an A9-Connect-A8 message 210. BS 127 then proceeds with signaling 216 to establish TCH 113 with MS 101. With the establishment of TCH 113 and the required network resources, MS 101 and target PDSN 141 are able to proceed with signaling 218 to establish a PPP connection and perform mobile internet protocol (MIP) registration as related to the inter-PDSN handoff.

Signaling flow diagram 400 depicts some alternative signaling to that illustrated in diagram 200 for the first group of embodiments. Diagram 400 depicts the alternative ADDS transfer signaling embodiments. In particular, signaling 404, 406, 412 and 414 between BS 127 and MSC 171 differ from the signaling depicted in diagram 200. In these alternative embodiments, SCCP Connection and TCH establishment does not occur until BS 127 receives A9-Connect-A8 message 210. The description of embodiments will now return to diagram 200.

In the prior art, once PPP and MIP procedures have been completed, the traffic channel between the MS and BS, SCCP connection between the BS and MSC, and A8 bearer connection between the BS and PCF remain connected, and the packet data session remains in the active state. When an inter-PDSN dormant mode handoff occurs, the traffic channel and A8 bearer connection are only required to complete the PPP connection establishment and MIP registration. Once the procedures are completed, the resources are no longer required unless the network has user packet data to send to the mobile coincidental to the dormant mode handoff. However, the BS is unaware whether signaling, or user data packets are being exchanged between the MS and PDSN.

Current 3GPP2 standards specify optional packet data inactivity timers for the MS and network. These optional timers expire after a fixed period of packet data inactivity, i.e., a fixed period of only idle RLP frames. Either the MS or the network may disconnect the packet data service option if such an inactivity timer expires or a PPP session timer expires. However, the value of the inactivity timers can be several minutes depending on the application supported by the PDSI. Hence, there may be a significant period of time after completion of the inter-PDSN DMHO during which network resources are blocked from being used for other calls or handoffs.

In contrast, in embodiments of the present invention, AN 121 determines when signaling related to the inter-PDSN handoff between MS 101 and target PDSN 141 has been completed and, in response, releases one or more of the resources blocked by the handoff. Embodiments of the present invention can be divided into groups based on how this determination is performed. In the first group of embodiments, the determination comprises receiving an indication from the target PDSN that the signaling related to the inter-PDSN handoff has been completed. Alternatively, the determination may comprise a request to transition the packet data session from an active state to a dormant state. Either way the indication/request is received in signaling from the target PDSN such as in an A11-Session Update message 220. For example, the indication/request may be conveyed via a Normal Vendor/Organization Specific Extension (NVSE) of A11-Session Update message 220. Signaling 220 is received by PCF 125 and the indication/request is conveyed to BS 127 via A9-Update-A8 message 222.

Various embodiments exist for when target PDSN 141 sends the indication/request to AN 121. Target PDSN 141 may consider factors in addition to the completion of the PPP/MIP handoff messaging with MS 101. For example, target PDSN 141 may first ensure that it has not received packet data from the MS or for the MS in addition to the signaling related to the inter-PDSN handoff. In other words, the PDSN may check to make sure that there is no user data (i.e., non-handoff-related data) to be exchanged before sending the indication/request to AN 121.

As another example, target PDSN 141 may also ensure that AN 121 has indicated that MS 101 does not have data ready to send (DRS). Such an indication may first be received by AN 121 from MS 101 in Origination message 202. In particular, the indication could be conveyed by setting a "DRS" field in message 202 to "0". AN 121 would then convey to target PDSN 141 the indication that MS 101 does not have data ready to send by using A11-Registration Request message 212, for example. Having this information allows PDSN 141 to determine during the initial registration with greater certainty whether MS 101 plans to send data to the network upon completion of the dormant mode handoff. Besides knowing whether IP network 151 has data to send to MS 101 and when the PPP/MIP registration has been completed, PDSN 141 would now also know whether MS 101 has data to send at the time of the Initial registration request. This allows the PDSN to determine with greater certainty whether the session should go dormant.

Again, A11-Session Update message 220 is received by PCF 125 from PDSN 141 and the indication that the PPP/MIP handoff signaling has been completed is conveyed to BS 127 via A9-Update-A8 message 222. Various embodiments exist for determining whether the packet data session of MS 101 should return to the dormant state after BS 127 receives this signaling completed indication. BS 127 may consider factors in addition to the completion of the PPP/MIP handoff messaging. For example, BS 127 may first ensure that MS 101 has indicated that it does not have data to send after the dormant mode handoff. In particular, this indication may be conveyed by MS 101 setting the "DRS" field in Origination message 202 to "0". As another example, BS 127 may also ensure that it has not received packet data from MS 101 after MS 101 completed the signaling related to the inter-PDSN handoff. Having determined that the packet data session of MS 101 should return to the dormant state, BS 127 performs signaling 226 and 236 to release the SCCP connection with MSC 171, performs TCH release signaling 230 to release TCH 113, and performs A9-Release-A8 signaling 232 to release the A8 bearer connection.

As described above, in embodiments of the present invention, AN 121 determines when signaling related to the inter-PDSN handoff between MS 101 and target PDSN 141 has been completed and, in response, releases one or more of the resources blocked by the handoff. Embodiments of the present invention can be divided into groups based on how this determination is performed. In the first group of embodiments, the determination comprises either receiving an indication from the target PDSN (as described at length above) or determining that a new packet data inactivity timer has expired.

Unlike prior art packet data timers, this new timer is specifically tailored for the inter-PDSN dormant handoff scenario. Nonetheless, an existing timer, the Radio Network Packet Data Inactivity Timer (RN-PDIT) as described in TIA-2001.3-C Section 2.17.9), may be used, although in a novel manner. The various embodiments described above for when target PDSN 141 sends the indication/request to AN 121 also apply for determining when PDSN 141 would send a timer value for this packet data inactivity timer. Thus, A11-Session Update message 220 may in these embodiments convey a very short timer value for the RN-PDIT to signal AN 121 to transition the packet data session of MS 101 to dormant mode soon after completing the PPP/MIP signaling 218. Alternatively, a value for this packet data inactivity timer could be sent by PDSN 141 at the time of registration in A11-Registration Reply message 214. The timer value would be set to expire soon after PPP/MIP signaling 218 has been completed to enable the resources used by the session to be quickly released.

Signaling flow diagram 300 depicts a second group of embodiments for improved inter-PDSN dormant mode handoffs. In this group of embodiments, BS 127 detects the inter-PDSN handoff and in response starts an MS-PDSN handoff signaling timer. BS 127 may detect the inter-PDSN handoff by recognizing that MS 101 sent Origination message 202 with a "DRS" field set to "0" and that PDSN 141 responded with a DAI (Data Available Indication) indication in A11-Registration Reply message 314 and A9-Connect-A8 message 310 (or for BS/PCF implementations merely recognizing that a new PDSN is selected).

BS 127 starts MS-PDSN handoff signaling timer 311 upon completion of network connections. The timer value is set to a value larger than it normally takes to complete PPP negotiation and MIP registration (5 seconds, for example). Upon expiration of MS-PDSN handoff signaling timer 319, BS 127 determines whether any packet data is being sent between MS 101 and PDSN 141. If not, BS 127 assumes PPP/MIP signaling 218 has completed and that there is no application data to be exchanged; BS 127 thus proceeds to transition the packet data session of MS 101 to the dormant state. Otherwise, if packets are still being exchanged after PDSN handoff signaling timer expires 319, the BS assumes PPP/MIP signaling 218 has been completed and that application data is being exchanged. BS 127 would then allow the packet data session of MS 101 to remain in the active state.

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention. In addition, those of ordinary skill in the art will appreciate that the elements in the drawings are illustrated for simplicity and clarity, and have not necessarily been drawn to scale. For example, the dimensions of some of the elements in the drawings may be exaggerated relative to other elements to help improve an understanding of the various embodiments of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for an improved inter-PDSN (Packet Data Serving Node) dormant mode handoff comprising:
   exchanging, by an Access Network (AN) with a target PDSN, signaling to support an inter-PDSN handoff of a packet data session of a mobile station (MS);
   establishing, by the AN with the MS, a traffic channel (TCH) to support the inter-PDSN handoff;
   determining, by the AN, that signaling between the MS and the target PDSN related to the inter-PDSN handoff has been completed;
   in response to the determination that the signaling between the MS and the target PDSN has been completed, releasing, by the AN, the TCH.

2. The method of claim 1, wherein the signaling to support the inter-PDSN handoff comprises signaling from the group consisting of an A11-Registration Request and an A11-Registration Reply.

3. The method of claim 1, wherein the signaling related to the inter-PDSN handoff comprises signaling from one or more of the group of signaling types consisting of point-to-point (PPP) connection establishment signaling and mobile internet protocol (MIP) signaling.

4. The method of claim 1, wherein releasing the TCH is performed in response to determining, by the AN, that the signaling between the MS and the target PDSN related to the inter-PDSN handoff has been completed, that the MS has indicated that it does not have data to send after the dormant mode handoff, and that the AN has not received packet data from the MS after completing the signaling related to the inter-PDSN handoff.

5. The method of claim 1, further comprising:
   receiving, by the AN from the MS, an origination message indicating that the MS is requesting a dormant mode handoff and does not have data ready to send;
   sending, by the AN to the target PDSN, an indication that a handoff is being performed and the MS does not have data ready to send.

6. The method of claim 1, further comprising:
   in response to the determination that the signaling between the MS and the target PDSN has been completed, releasing, by the AN, a Signaling Connection Control Part (SCCP) connection between the AN and a mobile switching center (MSC).

7. The method of claim 1, wherein determining that the signaling between the MS and the target PDSN has been completed comprises
   receiving, by the AN from the target PDSN, an indication that the signaling between the MS and the target PDSN related to the inter-PDSN handoff has been completed.

8. The method of claim 7, wherein determining that the signaling between the MS and the target PDSN has been completed comprises
   receiving, by the AN from the target PDSN, a request to transition the packet data session from an active state to a dormant state.

9. The method of claim 7, wherein the indication that the signaling related to the inter-PDSN handoff has been completed is included within an A11-Session Update message.

10. The method of claim 9, wherein the indication that the signaling related to the inter-PDSN handoff has been completed is conveyed via a Normal Vendor/Organization Specific Extension (NVSE) of the A11-Session Update message.

11. The method of claim 7, further comprising sending, by the target PDSN to the AN, the indication that the signaling related to the inter-PDSN handoff has been completed, in response to determining, by the target PDSN, that the signaling between the MS and the target PDSN related to the inter-PDSN handoff has been completed and that the target PDSN has not received packet data from the MS or for the MS in addition to the signaling related to the inter-PDSN handoff.

12. The method of claim 11, wherein sending the indication that the signaling related to the inter-PDSN handoff has been completed is performed in response to determining additionally, by the target PDSN, that the AN has indicated that the MS does not have data ready to send.

13. The method of claim 1, further comprising receiving, by the AN from the target PDSN, a timer value for a packet data inactivity timer.

14. The method of claim 13, wherein the timer value is received via a message from the group consisting of an A11-Session Update message and an A11-Registration Reply message.

15. The method of claim 13, wherein determining that the signaling between the MS and the target PDSN has been completed comprises
determining, by the AN, that the packet data inactivity timer has expired and that the MS and the target PDSN are no longer exchanging packet data.

16. The method of claim 13, further comprising sending, by the target PDSN to the AN, the timer value for a packet data inactivity timer, in response to determining, by the target PDSN, that the signaling between the MS and the target PDSN related to the inter-PDSN handoff has been completed and that the target PDSN has not received packet data from the MS or for the MS in addition to the signaling related to the inter-PDSN handoff.

17. The method of claim 13, wherein sending the timer value is performed in response to determining additionally, by the target PDSN, that the AN has indicated that the MS does not have data ready to send.

18. The method of claim 1, further comprising starting, by the AN, an MS-PDSN handoff signaling timer, in response to detecting an inter-PDSN handoff for the MS.

19. The method of claim 18, wherein determining that the signaling between the MS and the target PDSN has been completed comprises
determining, by the AN, that the MS-PDSN handoff signaling timer has expired and that the MS and the target PDSN are no longer exchanging packet data.

20. An Access Network (AN) for facilitating an improved inter-PDSN (Packet Data Serving Node) dormant mode handoff, the AN comprising:
a packet control function (PCF)
adapted to exchange, with a target PDSN, signaling to support an inter-PDSN handoff of a packet data session of a mobile station (MS);
a base station (BS), communicatively coupled to the PCF,
adapted to establish, with the MS, a traffic channel (TCH) to support the inter-PDSN handoff,
adapted to determine that signaling between the MS and the target PDSN related to the inter-PDSN handoff has been completed, and
adapted to release the TCH, in response to the determination that the signaling between the MS and the target PDSN has been completed.

21. The AN of claim 20, wherein the BS, as adapted to determine that the signaling between the MS and the target PDSN has been completed, is adapted to
receive, from the target PDSN via the PCF, an indication that the signaling between the MS and the target PDSN related to the inter-PDSN handoff has been completed.

22. The AN of claim 20, wherein the BS is further adapted to receive, from the target PDSN via the PCF, a timer value for a packet data inactivity timer in response to the signaling to support the inter-PDSN handoff exchanged by the PCF with the target PDSN.

23. The AN of claim 22, wherein the BS, as adapted to determine that the signaling between the MS and the target PDSN has been completed, is adapted to
determine that the packet data inactivity timer has expired.

24. The AN of claim 20, wherein the BS is further adapted to start an MS-PDSN handoff signaling timer, in response to detecting the inter-PDSN handoff for the MS.

25. The AN of claim 24, wherein the BS, as adapted to determine that the signaling between the MS and the target PDSN has been completed, is adapted to
determine that the MS-PDSN handoff signaling timer has expired and that the MS and the target PDSN are no longer exchanging packet data.

* * * * *